UNITED STATES PATENT OFFICE.

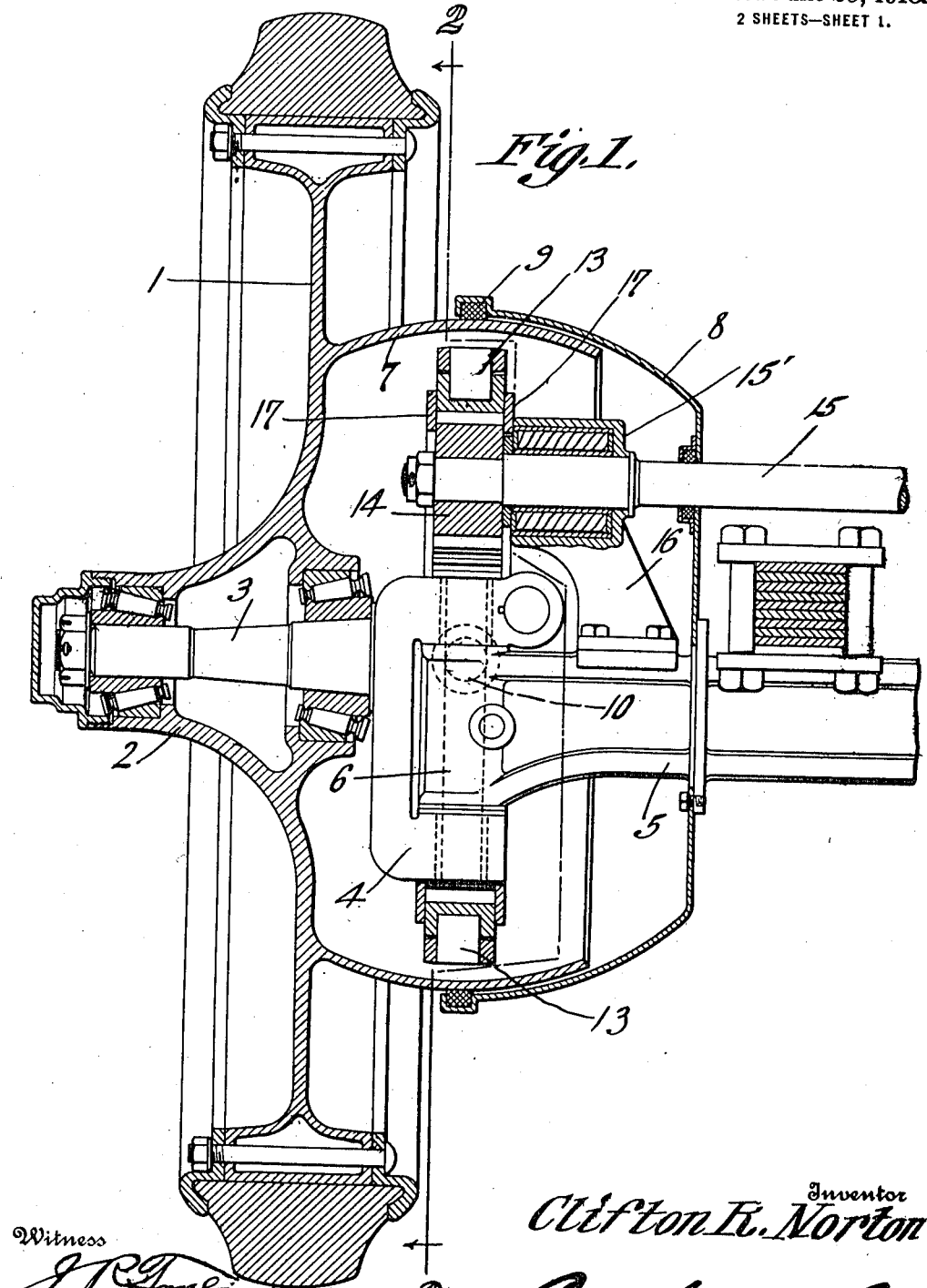

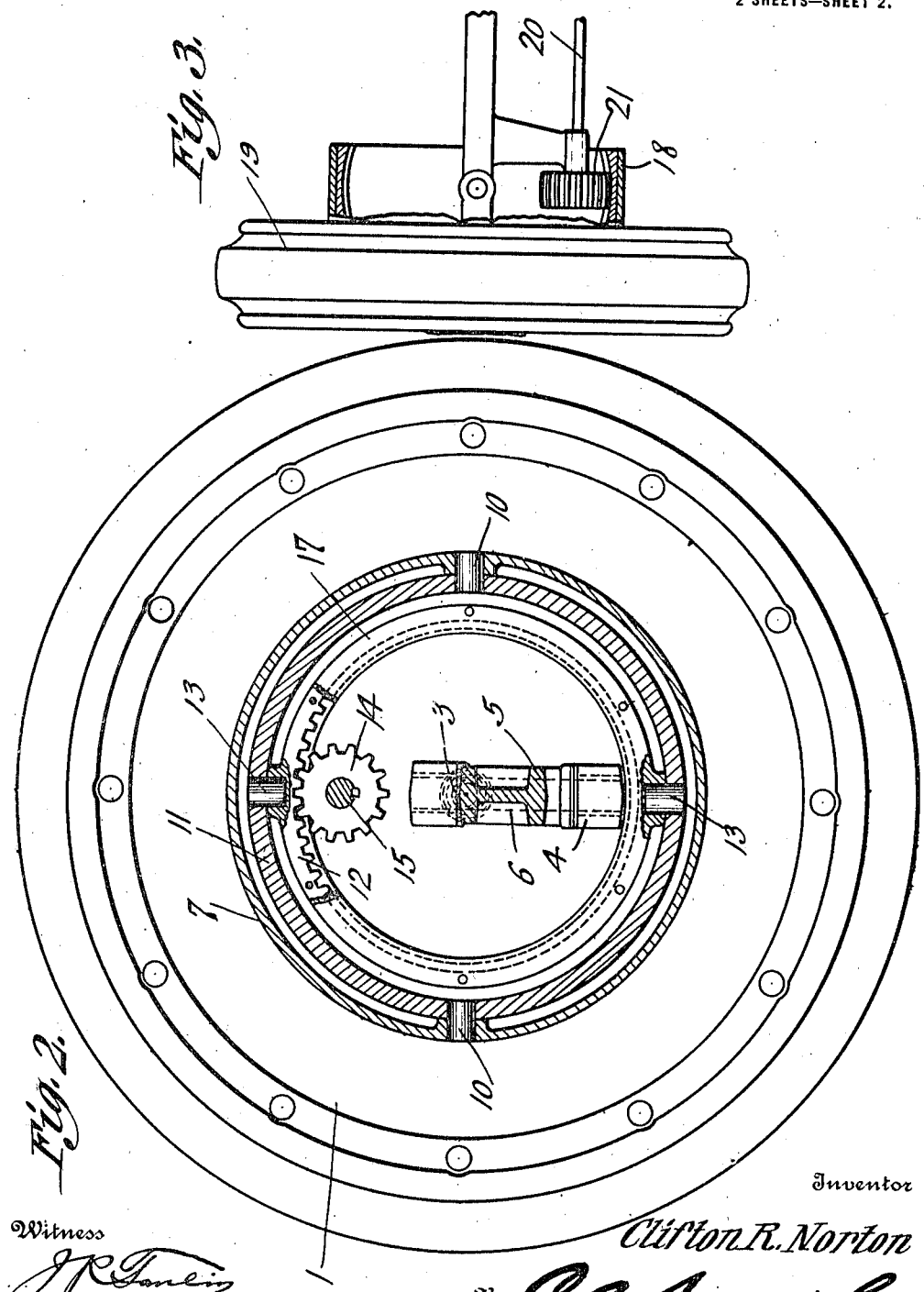

CLIFTON R. NORTON, OF THE UNITED STATES ARMY.

DRIVE MECHANISM FOR MOTOR-VEHICLES.

1,270,650.   Specification of Letters Patent.   Patented June 25, 1918.

Application filed December 29, 1917. Serial No. 209,467.

*To all whom it may concern:*

Be it known that I, CLIFTON R. NORTON, a citizen of the United States, and in the Army of the United States, have invented a new and useful Drive Mechanism for Motor-Vehicles, of which the following is a specification.

This invention relates to drive mechanism particularly designed for use in connection with motor trucks, one of the objects of the invention being to provide means whereby an unbroken shaft can be utilized for transmitting motion directly to a wheel capable of swinging relative to its axle to steer the vehicle.

A further object is to provide mechanism which not only transmits power directly from the drive shaft to the propelling wheel, but also constitutes a speed reduction means.

A still further object is to provide mechanism of this character which can be completely housed, thus to be protected from mud, dust, etc., and to be capable of operating in grease to insure an easy running mechanism.

A still further object is to provide drive mechanism of this character formed of the minimum number of parts and which permits a wide range of swinging movement of the driven wheel, thereby to enable the vehicle to make a shorter turn than has heretofore been possible where power has been applied to pivotally mounted supporting wheels.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings the preferred forms of the invention have been shown.

In said drawings:—

Figure 1 is a central transverse section through drive mechanism constituting the present invention.

Fig. 2 is a section on line 2—2 of Fig. 1.

Fig. 3 is a view, in diagram, of a modified form of mechanism which can be used.

Referring to the figures by characters of reference 1 designates a vehicle wheel of any desired construction the hub portion 2 of which is adapted to receive the spindle 3 projecting from the yoke member 4 of a knuckle provided at one end of the axle 5, said knuckle being provided with the usual pivot pin 6.

Extending from one face of the wheel 1 is a drum 7 which projects into a housing 8 fixedly secured to and surrounding the end portion of the axle 5. A suitable packing, indicated generally at 9, is interposed between the housing and the outer surface of the drum 2. In order to insure a tight connection between the packing and the drum 2, said drum is rounded so that any portion thereof, when brought to position in front of the axle 5, will be concentric with the pivot pin 6. The wall of the housing 8 is preferably similarly rounded so as to extend close to and parallel with the path of movement of the drum.

Mounted within the housing 8 with the axis of its pivot pins 10 intersecting the axis of the pivot pin 6, is the outer gimbal ring 11 in which is mounted an inner gimbal ring 12 the pivots 13 of which are, as ordinarily, extended at right angles to the pivot pins 10 of the ring 11. In the structure illustrated in Figs. 1 and 2 the inner ring 12 is in the form of an internal gear and the teeth of this gear are adapted to mesh with a drive pinion 14 secured to one end portion of a straight unbroken drive shaft 15 which extends into the housing 8 and is journaled within a suitable bearing 15' mounted on a bracket 16. This bracket is located within the housing 8 and is secured on the axle 5. The center of the gear is in vertical alinement with the pivot pin 6.

If desired, and as shown in Fig. 1, flanges 17 may be secured to the sides of the ring 12, thus to lap the sides of the drive pinion 14.

It will be noted that the housing 8 and the drum 7 coöperate to form a sealed inclosure in which the drive mechanism is located and, consequently, said inclosure may be used as a lubricant container.

It will be apparent that when the pinion 14 is rotated, the position of said pinion being fixed relative to the axle 5, the gear ring 12 engaged thereby will be rotated and motion will be transmitted therefrom through the ring 11 and the housing 8 to the wheel 1. In view of the particular mounting of the gimbals, the toothed ring 12 will be maintained in mesh with the gear 14 at all times during the angular adjustment of the wheel 1 relative to the axle 5 so that the transmission of power from the shaft 15 to the wheel is insured irrespective of the angle to which the wheel is shifted. As the housing 8 and the drum 7 can be employed as a lubricant holder, the parts of the mechanism will be constantly lubricated and the flanges on the ring 12 will serve not only to maintain the toothed ring in mesh with the gear 14 but will also serve to hold the lubricant upon the ring 12 and cause it to be conveyed upwardly to the gear 14, thereby reducing friction to the minimum, It has been found in practice that a wheel provided with drive mechanism such as described is capable of swinging through an arc of 30 degrees or more, thus permitting a very short turn to be made by the vehicle to which the mechanism is applied. Furthermore by having an unbroken straight shaft for driving the wheel, it is unnecessary to employ beveled gears, interposed shaft sections, and universal joints such as heretofore used. On the contrary the construction is greatly simplified and the mechanism is thus less likely to get out of order than heretofore.

In Fig. 3 has been shown in diagram a modified form of drive mechanism in which it is unnecessary to use the gimbals. Instead a gear 18 is mounted on one face of the wheel 19 and has its teeth curved from end to end so as to be concentric with the pivotal axis of the wheel as said teeth are brought successively to position in front of the axle. A straight drive shaft 20 is provided with a drive pinion 21 the teeth of which are correspondingly curved so as thus to remain in mesh with the teeth of the gear 18 during the angular adjustment of the wheel about its pivot. In other words while the gear 21 is fixed, it becomes possible to swing the wheel 19 about the vertical pivot of its knuckle, those of the teeth of gear 18 in mesh with the gear 21 sliding longitudinally upon the gear 21 during such adjustment and at the same time receiving power from said gear.

What is claimed is:—

1. In drive mechanism for motor vehicles, the combination with a wheel mounted for angular adjustment during its rotation, of a straight unbroken drive shaft, a ring gear connected to and revoluble with the wheel, and a drive pinion fixed on the shaft and constantly in mesh with said ring gear.

2. In drive mechanism for motor vehicles, the combination with an axle and a wheel mounted for angular adjustment relative thereto during its rotation, of a straight unbroken drive shaft, a ring gear revoluble with the wheel, and a drive pinion fixed on the shaft and constantly meshing with said gear to rotate the wheel during its angular adjustment.

3. In drive mechanism for motor vehicles, the combination with an axle and a wheel mounted for pivotal movement relative to the axle, of a straight unbroken drive shaft, a pinion fixedly mounted thereon, a ring gear constantly in mesh with the pinion, and a universal driving connection between said gear and the wheel.

4. In drive mechanism for motor vehicles, the combination with an axle and a wheel mounted for pivotal movement relative to the axle of a gear, gimbals constituting a connection between the gear and the wheel, and a drive pinion engaging the gear on one of the gimbals.

5. In drive mechanism for motor vehicles, the combination with an axle and a wheel pivotally mounted relative thereto, of a straight unbroken drive shaft, a pinion thereon, and gimbals connected to and revoluble with the wheel, one of said gimbals constituting a gear constantly meshing with the pinion.

6. In drive mechanism for motor vehicles, a wheel pivotally mounted, a straight unbroken drive shaft, a drive pinion fixedly mounted thereon, and gimbals connected to and revoluble with the wheel, one of said gimbals constituting a gear constantly in mesh with the pinion.

7. In drive mechanism for motor vehicles, the combination with a wheel mounted for pivotal movement, of a straight unbroken drive shaft, a drive pinion fixed thereon, an outer gimbal connected to the wheel and revoluble therewith, an inner gimbal connected to the outer gimbal, said inner gimbal constituting a gear constantly meshing with the pinion.

8. In drive mechanism for motor vehicles, the combination with a wheel mounted for pivotal movement, and a drum extending from the wheel, of a straight unbroken drive shaft, a drive pinion fixed on said shaft, and gimbals mounted within and connected to the drum, one of the gimbals constituting a gear constantly in mesh with the pinion.

In testimony that I claim the foregoing as my own, I have hereto affixed my signature in the presence of two witnesses.

CLIFTON R. NORTON.

Witnesses:
IVY E. SIMPSON,
HERBERT D. LAWSON.